F. G. HAAS.
PISTON.
APPLICATION FILED JULY 29, 1912.
1,092,834.
Patented Apr. 14, 1914.
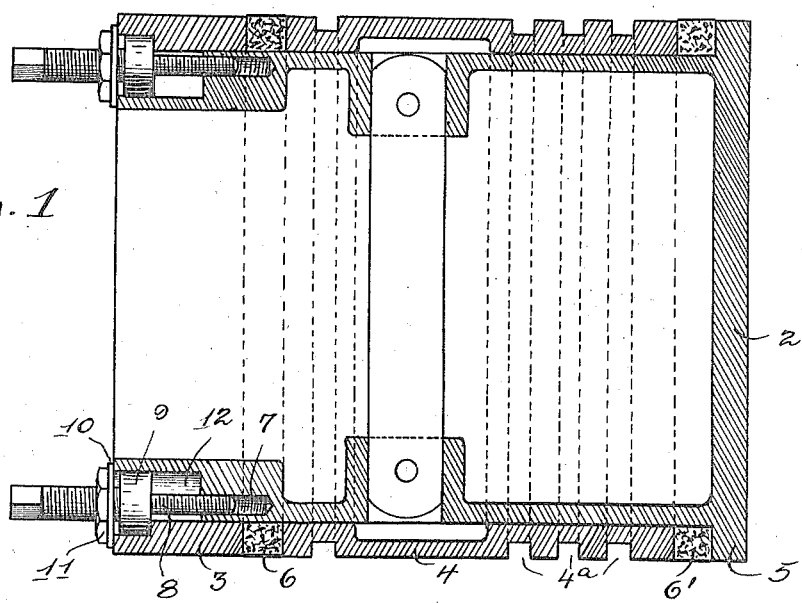
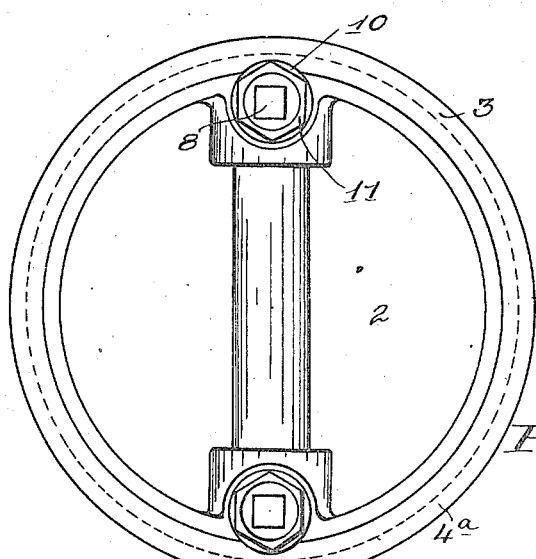
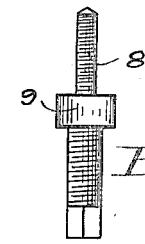
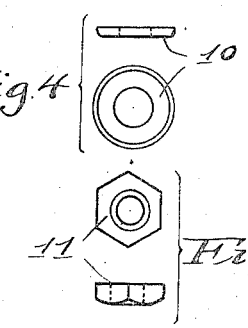
WITNESSES:
F. C. Caswell
F. M. Hardy
INVENTOR.
FERDINAND. G. HAAS.
BY John E. Stryker
ATTORNEY.

UNITED STATES PATENT OFFICE.

FERDINAND G. HAAS, OF ST. PAUL, MINNESOTA.

PISTON.

1,092,834.

Specification of Letters Patent.   Patented Apr. 14, 1914.

Application filed July 29, 1912. Serial No. 712,056.

*To all whom it may concern:*

Be it known that I, FERDINAND G. HAAS, a citizen of the United States, residing at St. Paul, in the county of Ramsey and State of Minnesota, have invented new and useful Improvements in Pistons, of which the following is a specification.

My invention relates to improvements in pistons.

My object is to provide an efficient piston readily adjustable to take up wear and also adapted to fit cylinders of different diameters by a mere substitution of sleeves of varying thickness.

My piston is designed for use on either steam or gas engines, hydraulic presses, ammonia and air compressors and all other engines requiring a tight-fitting piston.

In the accompanying drawings, Figure 1 is a central longitudinal section of my piston; Fig. 2 is a plan view thereof; Fig. 3 is a detail showing my compression member and Figs. 4 and 5 are details of the washer and nut respectively used on said compression screw.

The piston proper is composed of three parts, viz., the head 2 and the sleeves 3 and 4, which are adapted to snugly surround the head and to fit tightly into a cylinder of ordinary construction. Said sleeves may be formed with grooves 4ª to receive ordinary elastic metal piston rings. In order to adapt this composite cylinder for the uses proposed, it is formed with annular spaces between the sleeves 3 and 4 and between the sleeve 4 and the flange 5 on the end of the piston head. These annular spaces are filled by resilient packing rings 6 and 6', which are adapted upon the application of lateral pressure to expand radially. I prefer to make these rings of a composition of asbestos and graphite.

In the end of the head 2, opposite to the flange 5, threaded perforations 7 are formed adapted to receive the compression screws 8 which are formed with enlargements or shoulders 9, are furnished with washers 10 and held in place by set nuts 11. The head 2 and sleeve 3 are bored or reamed at 12 to receive the shoulders 9 on the compression screws 8, such bore in the head being of a greater depth than that in the sleeve 3. It will thus be seen that when the compression screws are turned into the perforations 7, the shoulders 9 are advanced into the bored out portion of the head and force the sleeve 3 down upon the packing ring 6, thereby expanding said ring radially and causing the same to move the sleeve 4 forward upon the second packing ring 6', which in turn is compressed laterally against the flange 5 and expanded radially. When the compression screws have been sufficiently advanced to properly adjust the packing rings in the cylinder, the set nuts 11 are screwed down to maintain the entire structure in adjusted position.

Should the parts become worn they may be refitted to each other by further advancing the compression screws and set nuts. The piston may also be adjusted to cylinders of varying diameter by substituting for the sleeves 3 and 4 others of greater or less thickness. A single sleeve and packing ring may sometimes suffice.

Having described my invention, what I claim as new and desire to protect by Letters Patent is:

1. A piston head having a plurality of peripheral piston sleeves slidable longitudinally thereon, resilient packing rings between said piston sleeves and a plurality of compression members on said piston head in operative engagement with one of said sleeves for shifting the sleeves and thereby expanding said rings radially.

2. A piston head formed with an external annular flange, a peripheral piston sleeve slidable on said head, said sleeve being formed with annular grooves to receive piston rings, a resilient packing ring between said sleeve and flange and a plurality of compression devices on said head in operative engagement with said sleeve to shift the same and thereby expand said resilient packing ring radially.

3. A piston head having a plurality of peripheral piston sleeves slidable longitudinally thereon, resilient packing rings between said piston sleeves, a plurality of screws threaded longitudinally into the end of said head and extending outwardly therefrom, devices on said screws to engage one of said sleeves and locking means for said screws, both the screws and locking means being accessible from the end of the piston.

In testimony whereof, I have signed my name to this specification in the presence of two subscribing witnesses.

FERDINAND G. HAAS.

Witnesses:
F. M. HARDY,
F. C. CASWELL.